United States Patent
Noël

(10) Patent No.: US 10,750,737 B2
(45) Date of Patent: Aug. 25, 2020

(54) MULTI-USE PENETRABLE HUNTING BLIND APPARATUS

(71) Applicant: Brian K. Noël, Harrison, MI (US)

(72) Inventor: Brian K. Noël, Harrison, MI (US)

( * ) Notice: Subject to any disclaimer, the term of this patent is extended or adjusted under 35 U.S.C. 154(b) by 172 days.

(21) Appl. No.: 15/984,915

(22) Filed: May 21, 2018

(65) Prior Publication Data

US 2019/0350191 A1 Nov. 21, 2019

(51) Int. Cl.
| | |
|---|---|
| *A01M 31/02* | (2006.01) |
| *E04H 15/58* | (2006.01) |
| *E06B 1/36* | (2006.01) |
| *E06B 3/38* | (2006.01) |
| *E04H 15/00* | (2006.01) |
| *F41H 5/26* | (2006.01) |

(52) U.S. Cl.
CPC .......... *A01M 31/025* (2013.01); *E04H 15/58* (2013.01); *E06B 1/36* (2013.01); *E06B 3/38* (2013.01); *E04H 15/001* (2013.01); *F41H 5/26* (2013.01); *Y10S 135/901* (2013.01)

(58) Field of Classification Search
CPC .... A01M 31/025; E04H 15/58; E04H 15/001; Y10S 135/901
USPC ................. 135/117, 901; 52/171.1; 160/90
See application file for complete search history.

(56) References Cited

U.S. PATENT DOCUMENTS

| | | | | |
|---|---|---|---|---|
| 1,294,879 A * | 2/1919 | Davis | ........................ | E06B 9/52 160/90 |
| 2,942,609 A * | 6/1960 | Ferguson | .................. | B60P 3/38 135/116 |
| 3,169,543 A * | 2/1965 | McGerty | .................. | E04H 15/48 135/152 |
| 3,516,205 A * | 6/1970 | Thomson | .................. | B24C 9/00 451/87 |
| 4,794,717 A * | 1/1989 | Horsmann | .......... | A01M 31/025 135/901 |
| 5,033,493 A * | 7/1991 | Senchuck | ................. | E04H 1/12 135/116 |
| 5,172,525 A * | 12/1992 | Cook | .................... | E04H 15/001 135/901 |
| 5,241,772 A * | 9/1993 | Hall | ...................... | A01M 31/00 135/117 |
| 5,311,648 A * | 5/1994 | Semons | .................... | B60J 11/00 135/115 |
| 5,371,966 A * | 12/1994 | Hall | ...................... | A01M 31/00 135/117 |
| 5,762,085 A * | 6/1998 | Punch | ................... | E04H 15/001 135/93 |

(Continued)

*Primary Examiner* — Robert Canfield
(74) *Attorney, Agent, or Firm* — Wayne State Patent Clinic

(57) ABSTRACT

A window apparatus that can either be retrofitted in an existing blind or have the dimensions to fit into a new blind to allow a hunter to hunt with either a firearm or a bow. The window apparatus is made up of a frame having at least two panels. One of the panels is substantially transparent to allow a hunter to look for game. The second panel has a slotted aperture that is made up of at least one elastomeric membrane. The slotted aperture allows a hunter to protrude a portion of a firearm through the membrane, creating a barrier to stop scent from egressing, heat from escaping in cold seasons, and precipitation and insects from coming into the hunting blind. The elastomeric membrane can conceal the firearm further by matching the color of the portion of the firearm.

20 Claims, 2 Drawing Sheets

(56) References Cited

U.S. PATENT DOCUMENTS

| | | | |
|---|---|---|---|
| 5,813,160 A | 9/1998 | Thoelke | |
| 5,918,615 A * | 7/1999 | Stuck, Sr. | E04H 15/38 |
| | | | 135/117 |
| 7,040,335 B1 | 5/2006 | Ransom | |
| 7,895,932 B1 | 3/2011 | Ohnstad | |
| 8,360,083 B2 * | 1/2013 | Anders, III | E04H 15/001 |
| | | | 135/151 |
| 8,776,814 B1 * | 7/2014 | Beam | E04H 15/44 |
| | | | 135/115 |
| 8,915,024 B2 * | 12/2014 | Carter | E04H 1/1205 |
| | | | 135/901 |
| 2002/0078988 A1 | 6/2002 | Valpredo | |
| 2003/0213359 A1 * | 11/2003 | Kropf | F41H 5/14 |
| | | | 89/36.09 |
| 2015/0201608 A1 * | 7/2015 | Steen | A01M 31/025 |
| | | | 49/413 |
| 2018/0206479 A1 * | 7/2018 | Hosmer | A01M 31/025 |

* cited by examiner

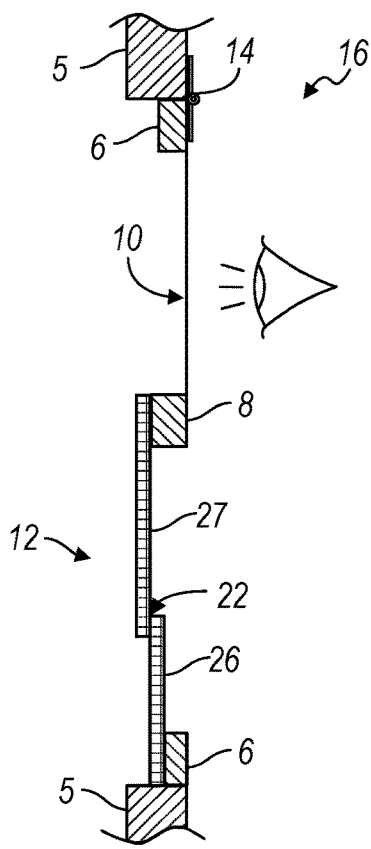 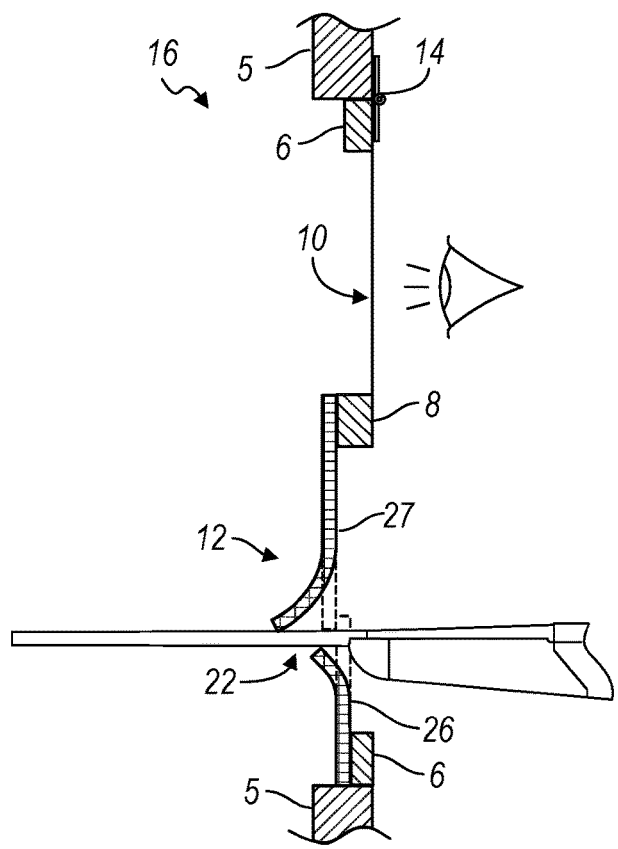
FIG. 3A  FIG. 3B
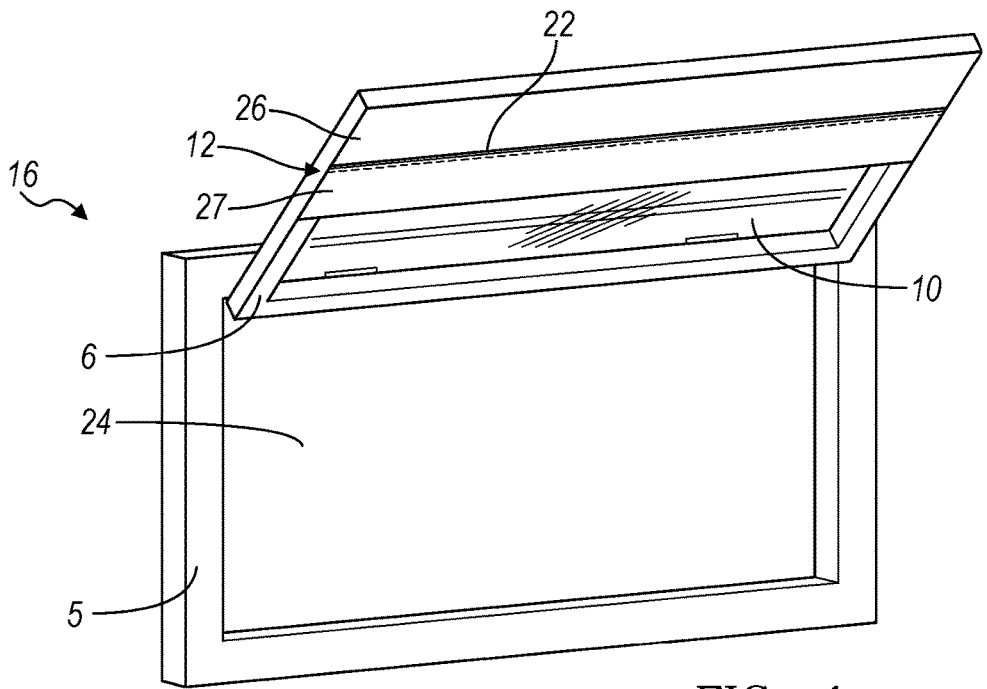
FIG. 4

US 10,750,737 B2

MULTI-USE PENETRABLE HUNTING BLIND APPARATUS

TECHNICAL FIELD

The present disclosure is directed to hunting blinds, and more particularly penetrable openings in hunting blinds.

BACKGROUND

In many hunting activities, an enclosure known as a hunting blind is commonly used. A hunting blind can be on an elevated platform, on a boat, in a tree, in the water, or on the ground. A hunting blind is sized to accommodate at least one to several hunters. Hunting blinds are used to conceal a hunter in search of game. To avoid being hunted, game possess defense mechanisms that allow them to be highly alert to movements, sounds, and scents. Any unfamiliar movements, sounds, and scents detected will deter game from coming within shooting range. Thus, there is a need for a hunting blind that allows a hunter to shoot game, such as with a firearm, a bow, a crossbow, or other weaponry, while minimizing the possibility of the hunter being seen, heard, or smelled.

The hunting season occurs in varying temperatures and weather depending on the desired game. Thus, there is an additional need for a hunting blind with an opening to use a firearm or other weaponry while minimizing the introduction of cold air, precipitation, and insects into the blind, depending on the season.

References describing attempts to address these needs can be found in U.S. Pat. Nos. 5,762,085, 5,813,160, 7,040,335 B1, U.S. Pat. No. 8,776,814 B1, U.S. Pat. No. 7,895,932 B1, U.S. Pat. No. 8,915,024, and U.S. Patent Application No. 2002/0078988 A1.

The disclosed embodiments have the advantages of concealing a hunter from being seen and allowing the hunter to shoot game without sudden movement. The embodiments disclose a substantially transparent portion that a hunter can view game through. The embodiments also disclose a flexible membrane containing a slotted aperture to allow the hunter to position a portion of a firearm through the aperture. When the hunter spots game, the hunter can fire without creating any movement. In addition, the elastomeric membrane may be chosen to be the color of the firearm portion to reduce the game from detecting the firearm as the hunter waits. The flexible membrane also may act as a barrier depending on the hunting season. In colder hunting seasons, the flexible membrane can reduce heat or scent from egressing the hunting blind. In warmer hunting seasons, the flexible membrane can keep precipitation and insects out of the hunting blind.

BRIEF SUMMARY

One embodiment is directed to a window for a hunting blind comprising a frame and at least one panel disposed within the frame. In an embodiment of the invention, a panel has two portions, wherein one of the first and second portions is connected to the frame. The first portion includes a substantially transparent portion and the second portion includes a flexible first membrane forming a slotted aperture sized to receive a portion of a firearm. In one embodiment, the flexible first membrane partially overlaps a second flexible membrane to cover a slotted aperture sized to receive a portion of a firearm. Alternatively, the flexible first membrane is a single membrane comprising a horizontal slit. In another embodiment, the first portion is adjacent to the second portion. In one embodiment of the invention, a first flexible membrane and a second flexible membrane partially overlap to form a slotted aperture sized to receive a portion of a firearm. In one embodiment, the frame is rectangular. In one embodiment of the invention, the first portion or the second portion can pivotably move relative to the frame to reveal an opening for bow or crossbow hunting. In another embodiment, the flexible first membrane is an elastomeric membrane. The elastomeric membrane may have a color, such as black or brown, selected to obscure a firearm portion.

BRIEF DESCRIPTION OF THE DRAWINGS

These and other features, aspects, and advantages will become better understood with regard to the following description, appended claims, and accompanying drawings where:

FIG. 3A shows a vertical sectional view of FIG. 2 taken along line 3.

FIG. 3B shows a vertical sectional view of FIG. 2 in use taken along line 3.

FIG. 4 shows a back view the window of FIG. 2 in an open configuration.

DETAILED DESCRIPTION

It is to be understood that this disclosure is not limited to the disclosed embodiments, but is intended to cover various modifications and equivalent arrangements included within the scope of the specification, appended claims, and their equivalents.

Figure 1:
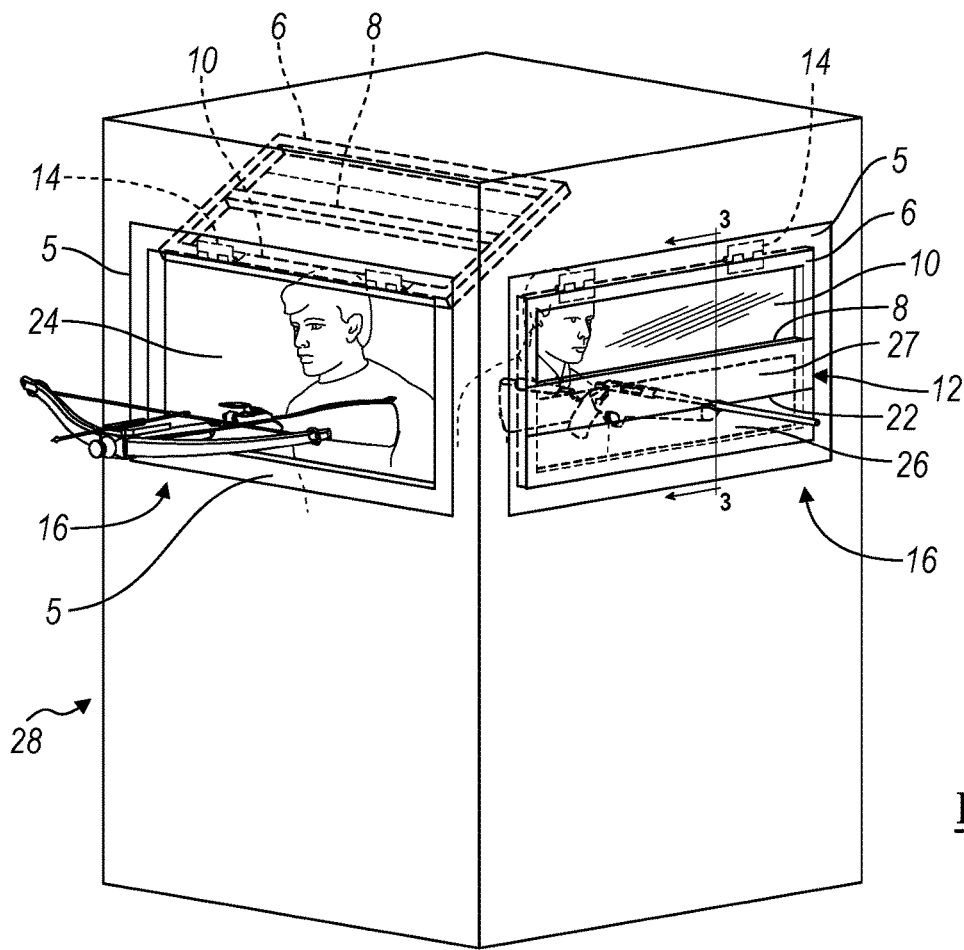
FIG. 1 shows a perspective view of a hunting blind, according to one embodiment.

A hunting blind 28 is an enclosure which may contain a wall having one or more openings 24. As shown in FIG. 1, a window apparatus 16 may be disposed into an opening 24 to allow a hunter to shoot a firearm, bow, or other weaponry at game. One embodiment of the invention comprises a window 16 having a panel 6, which includes two portions, disposed in a frame 5. The first portion 10 comprises a substantially transparent portion to allow the hunter to view game while inside the blind. The second portion 12 comprises a slotted aperture 22 sized to receive a portion of a firearm.

Different embodiments of the hunting blind in use are shown in FIG. 1. In one embodiment, a hunter can fire at game by inserting a portion of a firearm or other weaponry through the slotted aperture 22 in the second portion 12 of the window 16. In another embodiment of the invention, the window 16 may be pivotably positioned open relative to the frame to reveal the opening 24 and allow a hunter to shoot a bow or crossbow at game.

The window 16 can be of any dimension and size suitable for observing and shooting game. In one embodiment, the window 16 can be dimensioned to be about 36 inches in width and 12 inches in height. The window 16 can also be dimensioned within a range of 24 inches to 48 inches in width and 10 inches to 16 inches in height. However, the window 16 is not limited to these dimensions and can be created with a preference of dimension to be disposed into a new blind. In addition, the window 16 can be sized to retrofit into an existing blind, having the dimensions of the current opening 24. In one embodiment of the invention, the window 16 is rectangular. Alternatively, the shape of the window 16 may be pyramid, square, or any other suitable shape to allow a hunter to both look for game and protrude a firearm or other weaponry through a slotted aperture 22 or opening 24.

Figure 2:
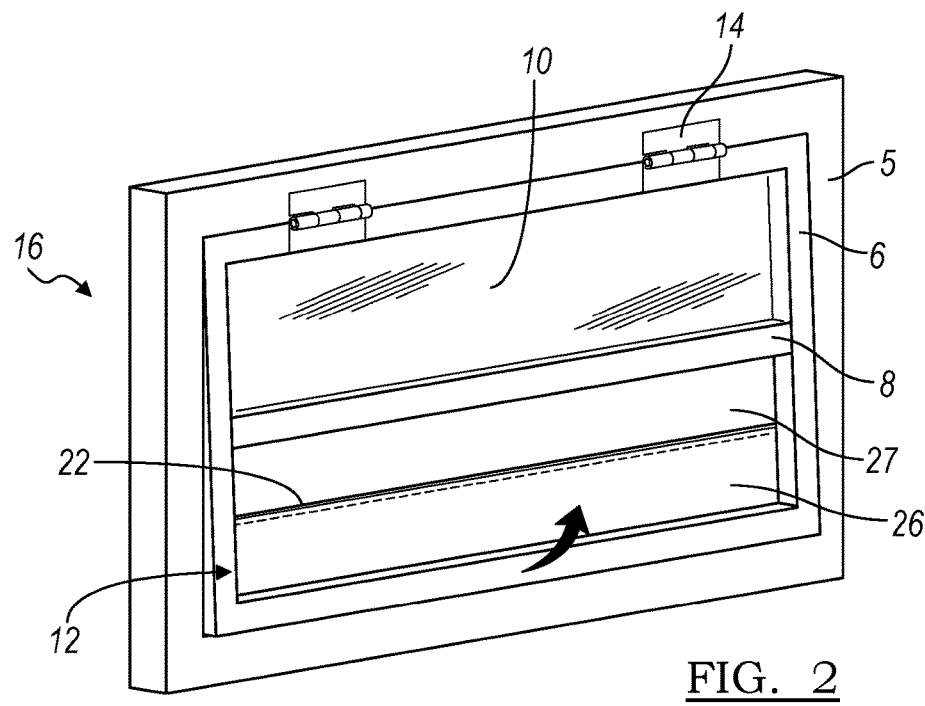
FIG. 2 shows a back view of a window of a hunting blind shown in FIG. 1.

In FIG. 2, one embodiment comprises a window 16 that is defined by a frame 5 made out of any suitable rigid material. Suitable rigid materials may be wood, aluminum stock, plastic injection molding, and recycled plastics. In one embodiment, disposed within the frame 5 is a panel 6 having two portions, a first portion 10 being substantially transparent and a second portion 12 having a slotted aperture 22. In one embodiment, the two portions fill the entire area of the frame 5. The portions may be pivotably connected to at least one portion of the frame 5. Alternatively, the panels may be pivotably connected to each other. The connector can be an object such as a hinge 14, but may also be a clip, pin, joint, fastener, or other hardware. In another embodiment, each of the two portions can be fixed to each other or to the frame 5.

In one embodiment, as shown in FIG. 2, the window 16 comprises a frame 5 where the first portion 10 and the second portion 12 are connected to the frame 5. The panel 6 defines the shape of at least two portions. In this embodiment, the two portions are horizontally partitioned 8. Alternatively, the two portions may be vertically partitioned. Another embodiment may have the portions connected directly to each other without a partition 8. The two portions may be adjacent to each other horizontally, vertically, or other variation of orientation.

The embodiment in FIG. 2 shows a substantially transparent portion 10. The substantially transparent portion 10 can be positioned so a hunter in the blind can see game located outside the blind. In one embodiment of the invention, the substantially transparent portion 10 is positioned above the second portion 12. The substantially transparent material can be made of any thermoplastic, glass, or acrylic glass, such as Poly(methyl methacrylate). To be substantially transparent, the material may be transparent enough to allow a hunter in the blind to see game without significant obstruction. The material chosen may be selected based on transparency and may additionally be selected based on safety.

In the embodiment in FIG. 2, the second portion 12 comprises a first flexible membrane 26 and a second flexible membrane 27, which partially overlaps the first flexible membrane 26 to cover a slotted aperture 22 sized to receive a portion of a firearm. Alternatively, the first membrane 26 is a flexible membrane and the second membrane 27 can be an edge of an apparatus, creating a slotted aperture 22. In an alternate embodiment, the first membrane 26 can be the only membrane and comprise a horizontal slit. Alternatively, the flexible membrane 26 can possess an overlap covering the slotted aperture 22 or have a vented aperture to receive a portion of a firearm.

As shown in FIG. 2, the first flexible membrane 26 and the second flexible membrane 27 of the second portion 12 can be made of any flexible, pliable material. In one embodiment, the first flexible membrane 26 and the second flexible membrane 27 are made of an elastomeric material. Elastomeric materials such as rubber, silicone, or latex, may be selected as the membrane material, but are not limiting.

In one embodiment, as shown in FIG. 2, the slotted aperture 22 is partially covered by the first flexible membrane 26 and the second flexible membrane 27. The slotted aperture can be created to be any dimension or size to accommodate a portion of a firearm or other weaponry. In one embodiment, the slotted aperture can be sized to be 30 inches in width. The slotted aperture 22 may range from 20 inches to 44 inches. Preferably, the slotted aperture 22 will have a width that is two inches less on each end of the width of the window 16. However, the slotted aperture 22 is not limited to this dimension and can be created to accommodate the width of the barrel of a firearm or other weaponry.

In the embodiment shown in FIG. 3A, the hunter in the blind can look through the substantially transparent portion 10 to see game. In the second portion 12 of the window 16, the first flexible membrane 26 and the second flexible membrane 27 partially overlap. When not in use, as shown in FIG. 3A, the slotted aperture 22 is seen closed, in its first operable position, by the partial overlap. In one embodiment of the invention, the thickness of the first flexible membrane 26 and the second flexible membrane 27 may range from 0.01 inches to 0.125 inches. However, the thickness of the membrane is not limited to this dimension and can be created with varying thicknesses that allow for enough displacement between the membranes to insert of a portion of a firearm or other weaponry through. In one embodiment, as shown in FIG. 3A, the membrane is attached to the outside of the partition 8 or a first portion 10 and the panel 6. The membrane attachment on the outside has the advantage of being more effective in preventing introduction of precipitation into the blind. In another embodiment, the membrane may be attached to the inside of the partition 8 or a first portion 10 and the panel 6.

Shown in FIG. 3A, the membrane can be connected to the frame 5, panel 6, or the first portion 10, using connectors such as wood screws, sheet metal screws, hex bolts, flange bolts, machine screws, lag bolts, anchors, or other hardware. In another embodiment, the membrane can be connected to the panel 6 or the frame 5 using adhesives or sealants such as physically hardening adhesives, chemically curing adhesives, pressure sensitive adhesives, one-component sealants, two-component sealants, or sealant tapes.

In the embodiment shown in FIG. 3B, the hunter looks through the substantially transparent portion 10 to see game. The hunter inserts a portion of a firearm or other weaponry through the slotted aperture 22. FIG. 3B shows the second portion 12 in use, where the first flexible membrane 26 and the second flexible membrane 27 are displaced by the insertion of the firearm to uncover the slotted aperture 22. This shows the slotted aperture 22 open, in its second operable position. The firearm is inserted through the slotted aperture 22 as the hunter waits for game. The firearm portion protruding out of the slotted aperture 22 in advance of targeting the game minimizes the hunter's movement and chance of detection. In an embodiment, the flexible first membrane 26 and the flexible second membrane 27 can be a color chosen to match a portion of a firearm to further obscure it, such as black or brown. Other alternative colors may be green, tan, or camouflage print, but are not limited to these colors.

In FIG. 4, one embodiment of the invention shows the window 16 with the panel 6 pivotably positioned open to reveal an opening 24 for protruding a bow or crossbow through. Alternatively, either a first portion 10 or a second portion 12 can separate independently to reveal an opening for a bow. In another embodiment, the first portion 10 and the second portion 12 can be independently attached to the frame 5 along at least one border or the first portion 10 or the second portion 12 can slide open or closed. Alternatively, the portions may open together as one unit or open independently of each other. In alternate embodiments, one portion can open while the other portion is fixed. In another embodiment of the invention, the portions can open to varying angled degrees, such as 180 degrees or 90 degrees, but are not limited to the aforementioned degrees. The portions can independently or as one unit be propped open using items such as a rod, bracket, wood, clasp, aluminum strips, pegs, latches, or other hardware.

In operation, the window 16 would be retrofitted into an existing blind or installed into a new blind. The dimensions and shape of the window 16 will be selected to be disposed into an opening 24 found in a hunting blind 28. If a hunter hunts with a bow, the window 16 allows a hunter to pivotably position relative to the frame open either one portion 10 or a frame 5 to reveal an opening 24 to insert a bow or crossbow through. The hunter is able to view game through the opening 24 as well as shoot game with a bow or crossbow. In another embodiment, the hunter can open a first portion 10 or a second portion 12 to independently create an opening for a bow.

If a hunter hunts with a firearm, the hunter will keep the window 16 closed and insert a portion of his firearm through a first flexible membrane 26 and a second flexible membrane 27, displacing the membranes to reveal a slotted aperture 22. At the start of the hunt, the hunter will protrude a portion of the firearm out of the slotted aperture 22 while waiting for game as the hunter looks through the substantially transparent portion 10. The hunter will reduce movement and noise by protruding the firearm through the slotted aperture 22 at the start of the hunt.

A person skilled in the art will understand that the embodiments described are an illustration and are not meant to limit the scope of the invention. Although the embodiment of the invention has been described in considerable detail with reference to certain preferred versions thereof, other versions are possible. All the features in this specification may be replaced by alternative features serving the same, equivalent, or similar purpose unless expressly stated otherwise. Thus, unless expressly stated otherwise, each feature disclosed is one example only of a generic series of equivalent or similar features.

What is claimed is:

1. A window for a hunting blind comprising:
a frame;
a panel disposed within said frame having a first portion and a second portion, and one of the first and second portions is connected to the frame;
the first portion includes a substantially transparent portion; and
the second portion includes a flexible first membrane, a flexible second membrane, and a horizontal slotted aperture located at the junction of the flexible first membrane and the flexible second membrane and sized to receive a portion of a firearm.

2. The window of claim 1, wherein:
the slotted aperture is located where the flexible first membrane partially overlaps the flexible second membrane.

3. The window of claim 1, wherein:
the first portion is adjacent to the second portion.

4. The window of claim 1, wherein:
at least one of the flexible first membrane and the flexible second membrane is an elastomeric membrane.

5. The window of claim 1, wherein:
wherein the slotted aperture is reversibly adjustable between a first position and a second position.

6. The window of claim 1, wherein:
the first portion or the second portion can pivotably move relative to the frame to reveal an opening for a bow.

7. The window of claim 6, wherein:
the first portion or the second portion is pivotably attached to the frame with a hinge.

8. The window of claim 1, wherein:
the flexible first membrane is black or brown to obscure a firearm portion.

9. A hunting blind comprising:
an enclosure having at least one wall having an opening;
a frame disposed in the opening; and
a panel disposed within said frame having a first portion and a second portion,
wherein one of the first and second portions is connected to the frame, the first portion includes a substantially transparent portion, and the second portion includes a flexible first membrane, a second flexible membrane, and a horizontal slotted aperture located at the junction of the flexible first membrane and the flexible second membrane and sized to receive a portion of a firearm.

10. The hunting blind of claim 9, wherein:
the slotted aperture is located where the flexible first membrane partially overlaps the flexible second membrane to form a slotted aperture sized to receive a portion of a firearm.

11. The hunting blind of claim 9, wherein:
the first portion is adjacent to the second portion.

12. The hunting blind of claim 9, wherein:
at least one of the flexible first membrane and the flexible second membrane is an elastomeric membrane.

13. The hunting blind of claim 9, wherein:
the slotted aperture is reversibly adjustable between a first position and a second position.

14. The hunting blind of claim 9, wherein:
the first portion or the second portion can pivotably move relative to the frame to reveal an opening for a bow.

15. The hunting blind of claim 14, wherein:
the first portion or the second portion is pivotably attached to the frame with a hinge.

16. The hunting blind of claim 9, wherein:
the flexible first membrane is black or brown to obscure a firearm portion.

17. A method of constructing a hunting blind comprising:
providing a hunting blind with an opening; and
positioning a frame in said opening,
wherein the frame includes a panel having a first portion that is substantially transparent and a second portion that includes a flexible first membrane, a flexible second membrane, and a horizontal slotted aperture located at the junction of the flexible first membrane and the flexible second membrane and sized to receive a portion of a firearm.

18. The constructing method of claim 17, wherein:
the slotted aperture is located where a flexible first membrane partially overlaps a second flexible membrane.

19. The constructing method of claim 17, wherein:
the first portion or the second portion can pivotably move relative to the frame to reveal an opening for a bow.

20. The constructing method of claim 17, wherein:
the flexible first membrane is black or brown to obscure a firearm portion.

* * * * *